Figure 1:
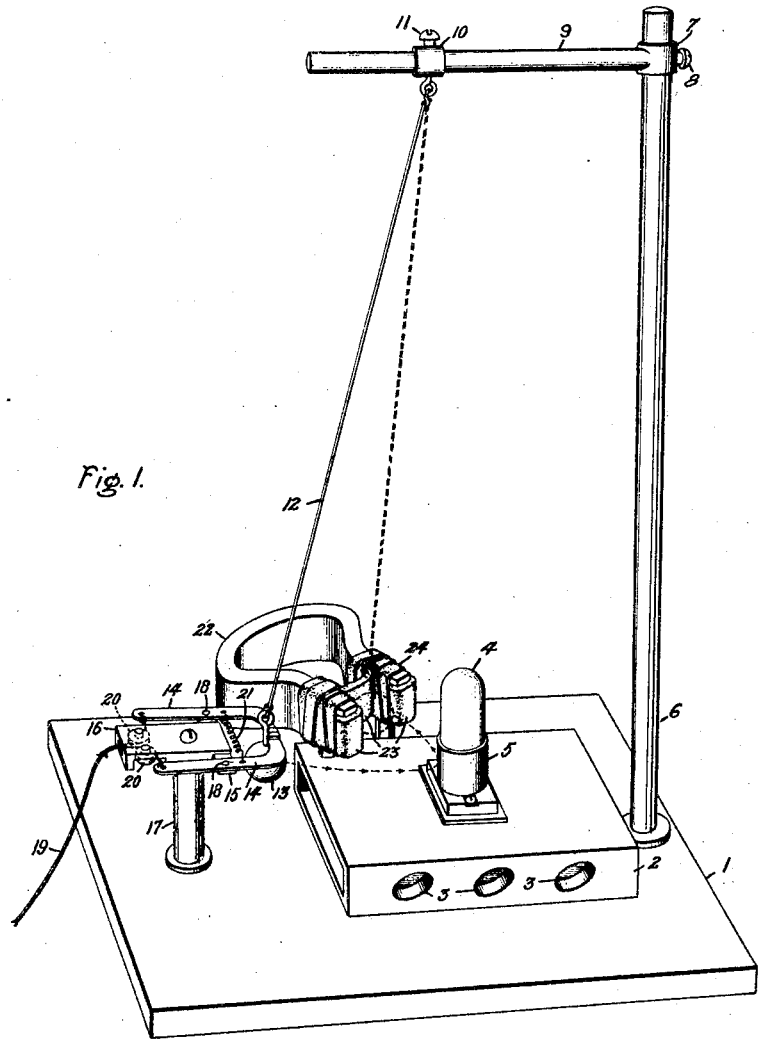

Sept. 29, 1931.    A. C. ROCKWOOD ET AL    1,825,548
TUBE TESTING APPARATUS
Filed April 30, 1929    2 Sheets-Sheet 1

Inventors:
Alan C. Rockwood,
Warren R. Ferris;
by Charles E. Mulla
Their Attorney.

Sept. 29, 1931.   A. C. ROCKWOOD ET AL   1,825,548
TUBE TESTING APPARATUS
Filed April 30, 1929    2 Sheets-Sheet 2

Inventors:
Alan C. Rockwood,
Warren R. Ferris;
by Charles E. Tullar
Their Attorney.

Patented Sept. 29, 1931

1,825,548

UNITED STATES PATENT OFFICE

ALAN C. ROCKWOOD AND WARREN R. FERRIS, OF SCHENECTADY, NEW YORK, ASSIGNORS TO GENERAL ELECTRIC COMPANY, A CORPORATION OF NEW YORK

TUBE TESTING APPARATUS

Application filed April 30, 1929. Serial No. 359,360.

The present invention relates to testing apparatus and is directed more particularly to the determination and measurement of microphonic action in thermionic devices.

Microphonic effects are usually considered to include all of that class of noises in a vacuum tube output circuit which are due to external disturbances acting upon the tube in some fashion other than through the electrical circuits. These effects are caused in substantial degree by relative motion between the various elements in the tube which result in variations in the plate current due to certain factors including more particularly the change in plate resistance of the tube. In view of the fact that in the small or receiving type of tube the electrodes are usually mounted from one end of the envelope, there is considerable opportunity for tubes of this character to become microphonic when subjected to vibration or shock. The extraneous impulses may be the result of a continuous vibration as when the tube is mounted on aircraft, or when there is acoustic feed-back between a loud speaker placed so close to the radio set as to cause the speaker to build up a sustained mechanical vibration or howl. On the other hand, a tube may be subjected to a sudden, intermittent jar or severe shock as when employed, for example, in a condenser microphone amplifier stand which may be accidentally jarred. It is evident that a test apparatus which will accurately and reproducibly discriminate between the amounts of microphonic effects offered by the various electrode and support arrangements to vibration, is highly desirable, not only to furnish reliable data for improving generally the quality of radio tubes but also selectively to determine the adaptations of various electrode and support constructions to particular uses when subjected to special kinds of vibration. The simplest sort of test apparatus for microphonics consists of an audio frequency amplifier of fairly high gain, the tube under test being used in the first stage. If the tube be struck with the finger, the output from the amplifier may be heard in the loud speaker. The relative loudness and the time of damping of the sound wave serve as a means of comparison of the various tubes tested, a good tube giving a small disturbance, highly damped with no rattle or cracking sound. This test however, depends upon the acoustic judgment of the operator in comparing the different sounds and upon the severity of the blow from his finger. Such a test may be used for general comparisons between different lots of vacuum tubes of the same general type altho obviously, two operators will not agree exactly upon the microphonic merits of a number of tubes and a test of this sort is neither accurate nor definitely reproducible.

An object of the present invention is to provide a test arrangement for microphonics which arrangement will simulate operating conditions as far as possible and which will offer an accurate and reproducible measurement of the electrical effects of the microphonics both as to impulse severity and rate of impulse decay, and, in addition, is free from the personal judgment of the operator. Another object is to provide an arrangement of this kind which is of simple construction, and operation and lends itself readily to calibration. These objects are attained in brief by employing a flexible socket mounting for the vacuum tube, the latter being energized by suitable grid and plate voltages which, if desired, may be the normal operating voltages, striking the socket with an impact of reproducible intensity and measuring either by an oscillograph or preferably by a meter the quantity of electricity represented by the transient wave. Determinations made in this manner represent the integrated value of all the electrical effects introduced into an amplifying circuit by a microphonic tube when subjected to shock, hence, determines correctly, the relative merits of the various types and individual tubes.

Figure 2:
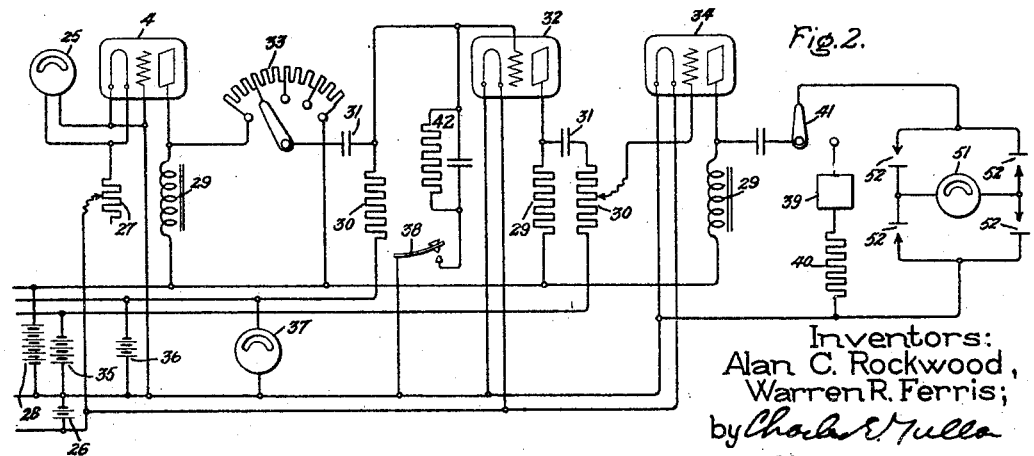
Figure 3:
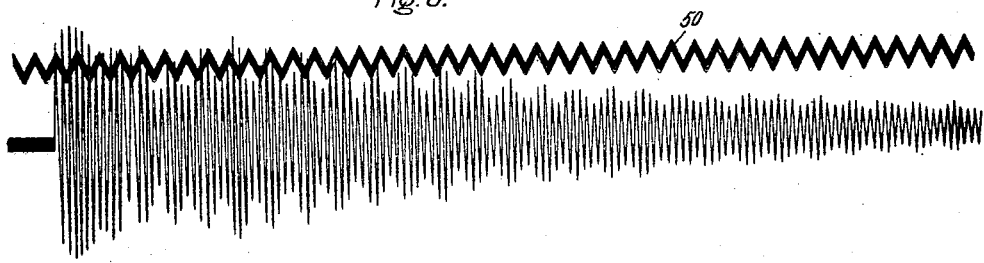
Figure 4:
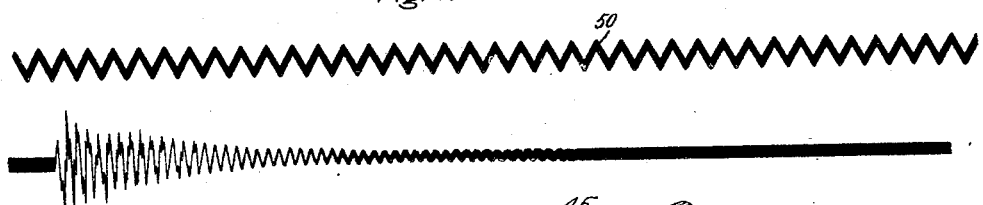
Figure 5:
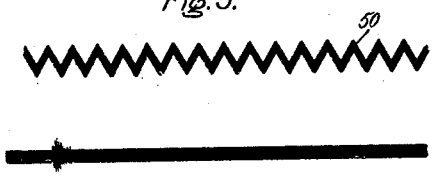
Figure 5:
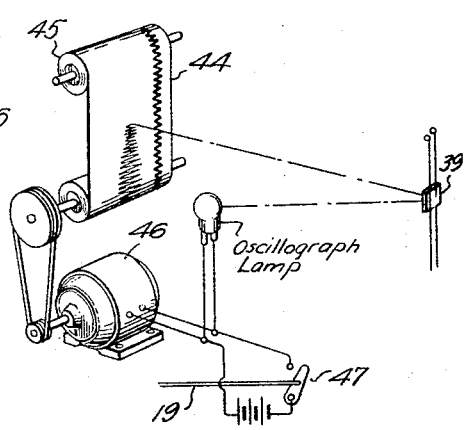

The invention will be better understood when reference is made to the drawings which represent preferred embodiments thereof. Fig. 1 is a perspective view of the tube undergoing test showing the preferred manner of deriving a ballistic impact; Fig. 2 illustrates a typical form of an electrical system for amplifying the microphonics derived from the tube under test and having as an output circuit, instruments for indicating and measuring the disturbances in accordance with our invention while Figs. 3, 4 and 5 are exemplary oscillograms obtained by the improved arrangement during the course of a test. Fig. 6 is a diagrammatic view of a portion of a recording oscillograph useful in the practice of the invention.

Referring to Fig. 1, numeral 1 indicates a base of insulating material such as wood, and upon which is affixed a resilient body 2 in the form of a hollow box made preferably of wood, e. g., dry sandalwood and open at both ends to increase the resilient qualities thereof. There are also a series of openings 3 bored in opposite sides of the box which communicate with the interior to prevent troublesome resonance in the box. The tube 4 to be tested is mounted in a socket 5 of rigid design which is secured in any suitable manner to the upper surface of the box 2. The base supports an upright 6 preferably a metal rod, to the upper end of which is preferably slidably mounted by means of a collar 7 and a clamping screw 8, a horizontal bar 9 also of metal. The bar 9 carries a combined collar and hook attachment 10 which is arranged to slide along the bar and to be rigidly fixed in proper position by means of a screw 11. A cord 12 is attached at one end to the hook and suspends from the other end a weight 13 shown as a metal ball preferably of iron. This weight is held in a poised position, out of vertical alignment, by two oppositely disposed fingers 14, pivotally mounted on arms 15 which extend from a plate member 16 secured to a pedestal 17. These fingers are free to move in a horizontal plane about the pivots 18 when pressure is exerted on each of the fingers at the end remote from the ball 13. This pressure conveniently may be exerted by a cord 19 which passes through an opening in the plate member 16 and around the idler pulleys 20, 20 so that when the cord is pulled equal pressure may be applied at one end of both fingers causing the opposite ends to move away from one another. The end of the fingers nearest the ball are extended inwardly so that when the ends are brought together due to the action of tension spring 21, the ball is firmly held in the poised position as shown. It is evident that a pull on cord 19 will release the ball which thereupon may strike the socket 5, pendulum fashion describing a path indicated roughly by the dotted line. If the force of impact is great enough there is tendency for the weight 13 to rebound and unless a retaining means is provided to catch the ball on the first rebound the socket may be subjected to a number of impacts of a variable non-reproducible character. Accordingly, there is provided a permanent magnet 22 conveniently of the horseshoe type secured to the base 1 and across the legs of which is stretched a strip of damping material 23, such as felt, secured to the magnet in any suitable manner, e. g., by binding with friction tape 24. The distance between the parallel sides of the magnet should be such as snugly to embrace the ball member 13 and to exercise a magnetic retaining hold sufficient to prevent the ball from striking the socket 5 a second time. The relative positions of the pedestal 17, magnet 22 and socket 5 on the base 1 may be determined by experiment and it is evident that the magnet or rather the position of the ball when resting against the magnet preferably should be directly below the collar 10 in order to reduce the magnetic holding force necessary to retain the ball.

In Fig. 2 there is shown a typical form of circuit for translating and amplifying the microphonic effects produced in the tube 4 by the impact of ball 13, into electrical effects suitable for record or visual indications. While a transformer or impedance coupled system may be employed, a resistance coupled circuit is particularly advantageous in that it assures distortionless amplification and hence offers greater accuracy in the final determinations. In the circuit shown, the tube 4 under test constitutes the first step of the amplifying system, a volt meter 25 being connected effectively across the filament terminals to check the filament voltage derived from a battery 26 which voltage may be adjusted by rheostat 27. The plate voltage for tube 4 and the succeeding amplifying stages may be obtained from a battery 28 through impedances 29 which are shown as chokes in the output circuit of tubes 4 and 34 and as a resistance in the output circuit of tube 32. The coupling between the amplifying stages comprises a resistance 30, the last one of which may be variable for reasons to be explained hereinafter, and a blocking condenser 31. Between the tube 4 and the second stage 32 of the amplifier there may be inserted a variable resistance 33 to limit and keep the magnitude of the microphonic disturbances, passed on by the tube under test, within the range of the indicating apparatus. The grid of the last amplifier 34 may be given a negative bias by battery 35, while the grid of tube 32 is biased by the source of electromotive force 36; the voltage of the source 36 may be determined by a volt meter 37. In the input circuit of the second stage 32, there is provided an electrical calibrating arrangement which consists of a circuit including a key 38 in series with a high resistance-condenser network 42, the circuit being connected between the grid and the filament. It is apparent that when the key 38 is closed the condenser charges through the resistance of the network, and when the key is opened the condenser discharges through the resistance which restores it to the initial uncharged state, the charging impulse being registered in the indicating devices. Inasmuch as the condenser charge is always a fixed quantity provided the charging voltage, which may be tested by the voltmeter 37 remains the same, the impulse applied to the grid of tube 32 from the charging of the condenser is always constant. Hence the overall amplification of tubes 32 and 34 may be adjusted by means of the variable resistance 30 to give a constant gain as determined by the response of the measuring or indicating devices to the impulse of constant intensity. The circuit may thus be calibrated from time to time to ensure accuracy of the determinations.

The output circuit or load for the multi-stage amplifier may include any suitable type of indicating device which will afford accuracy of measurement of the variable output current. For complete test data, it is desirable to register or measure not only the maximum rise of current but also the duration of the current wave or transient which determines the damping factor, in other words, it is necessary to obtain the integrated value of the complex transient wave of alternating current voltage. Data of this sort gives a record of the initial ripple which occurs for a sudden impact with the tube undergoing test and also the rate of decay of this impulse both of which are important as either may be objectionable in a radio receiver set subjected to external vibration. It is essential that the initial response be kept as low as possible to avoid noise in the loud speaker as a result of sudden shock and also that the ripple come to a minimum at an early time in order to avoid difficulties from sustained vibration. An oscillograph record is found to present a satisfactory means of studying the microphonic performance in the tube under test. Accordingly, in Fig. 2 there is shown an oscillograph 39 in series with the usual resistance 40 connected as one of the alternative loads in the output circuit of tube 34. A switch 41 may be moved to a horizontal position to make connection with the oscillograph. The tube performance record may be taken in the usual manner on a film 44 which is carried on roll 45 and has a length sufficient to record the entire microphonic transient. If desired, the oscillograph driving motor 46 may be started simultaneously with the operation of fingers 14 by a suitable switch 47 adapted to be closed by pulling on the cord 19 which also releases the fingers. However, it is found that by simply releasing the ball by manually operating the cord 19 while the film is continually moving in an exposed position gives satisfactory results. If desired, a 60 cycle voltage wave 50 may be placed on the film in any well known manner to serve as a reference of time. Several of such records are shown in Figs. 3, 4 and 5, which to a large extent, are self-explanatory. The abscissa represents time in seconds and the ordinate is given in current. Such oscillograms permit a comparison between tubes of similar and different types as regards the initial amplitude and duration of microphonic transients. The utilization of the microphonic records is dependent upon the experience in the use of these tubes in electrical translation circuits and equipment. A criticism of individual tubes must be based upon the expectancy that a certain form of oscillogram will indicate that microphonic difficulty will be experienced in the type of operation for which the tube is intended. For example, the tube giving the oscillogram of Fig. 3 would be objectionable because of its sustained or repeated vibration but such a tube might operate satisfactorily in normal radio reception where these conditions are absent. The tube whose microphonic quality is represented by the oscillogram in Fig. 4, is one of better than average damping and it is to be expected that it would be satisfactory in all applications other than those of extreme vibration or impact. The tube from which the oscillogram of Fig. 5 is taken represents a class which is specially designed for low microphonic output under severe conditions of impact of vibration, hence constitutes a device of a particularly high quality from a microphonic standpoint. The curve of Fig. 5 shows that the tube undergoing test is practically free from microphonics in that both the transient amplitude and duration are quite small. Accordingly, it is evident that an oscillographic film furnishes accurate data as to the microphonic performance of a number of tubes upon which a utility selection may be readily and scientifically based.

In the event that a complete record of performance is not desired, satisfactory indications may be read on a ballistic meter which may be arranged to indicate directly the integrated value of the transient. Thus, in Fig. 2, numeral 51 designates a ballistic galvanometer of well known construction which may be connected in the output circuit of amplifier 34 by means of the switch 41 when shifted to the vertical position. Inasmuch as the galvanometer is essentially a direct current instrument, whereas the transient constitutes an alternating current impulse, a rectifying system is necessary.

As shown, this rectifier may consist of a plurality of units 52 arranged in opposed relation to pass both halves of the transient and also in multiple arrangement in order to reduce resistance to current flow. If a square law rectifier be used, e. g., a vacuum tube detector, the deflection of the galvanometer will be proportional to $e^2 dt$ or the energy of the wave. However, if only relative or comparative readings are required any type of rectifier may be used, convenient types being a copper oxide couple which is particularly satisfactory for detecting microphonics of low frequency and a crystal detector which is efficacious at all frequencies but offers a higher resistance than the copper oxide couple. It is evident that irrespective of whether the meter 51 reads absolute or relative integrated values of the transient, it serves to give a substantially accurate and relatively quick determination of the microphonic quality of the tube under test, hence, is suitable for production testing.

It is evident that a test of the character described is simple to perform and offers a high degree of reproducibility with the utmost speed of operation. It has been found that the degree of reproducibility is not impaired by the various orientations of positions assumed by the electrodes within the tube under test or by a change in the position of impact with the tube socket by the ball member 13 provided the tube is seated squarely in the socket. It is the usual practice in operation to allow the ball to hit the socket once in order to seat the tube properly before the determining impact is given.

What we claim as new and desire to secure by Letters Patent of the United States, is:

1. A device for determining the amount of microphonic movement between the electrodes of a radio tube comprising a flexible base for supporting the tube, means for causing an impact with the base by a force of accurate reproducibility whereby a train of mechanical disturbances is set up between the electrodes, and means for measuring the integrated effect of said disturbances in terms of an electric current whereby a substantially accurate and reproducible test for microphonics is obtained.

2. A device for determining the amount of microphonic movement between the electrodes of a radio tube comprising a flexible base for supporting the tube, means for causing an impact with the base by a force of accurate reproducibility whereby a train of mechanical disturbances is set up between the electrodes, and means for measuring the integrated value of each train of disturbances in terms of an electric current whereby the time of duration and average intensity of the disturbance is determined.

3. A device for determining the amount of microphonic movement between the electrodes of a radio tube comprising a flexible base for supporting the tube, means for causing an impact with the base by a force of accurate reproducibility whereby a train of mechanical disturbances is set up between the electrodes, and means for measuring the integrated value of each train of disturbances in terms of an electric current whereby the time of duration and average intensity of the disturbance is determined, said measuring means comprising a rectifier and a ballistic meter.

4. In apparatus for testing a radio tube for microphonics, a resilient support for the tube, a weight normally held at a fixed distance from said support, means for imparting a force to the weight in the proper direction and of sufficient strength to cause an impact with the tube support whereby mechanical disturbances are set up between the electrodes of the tube, means for translating the mechanical disturbances into electrical impulses and means for measuring the integrated effect of the electrical impulses.

5. In apparatus for testing a radio tube for microphonics, a resilient support for the tube, a weight normally held at a fixed distance from said support, means for imparting a force to the weight in the proper direction and of sufficient strength to cause an impact with the tube support whereby mechanical disturbances are set up between the electrodes of the tube, means for translating the mechanical disturbances into electrical impulses and means for measuring the integrated effect of the electrical impulses, said means comprising an amplifier, a rectifier and an integrating meter.

6. In apparatus for testing a radio tube for microphonics, a resilient support for the tube, a weight normally held at a fixed distance from said support, means for imparting a force to the weight in the proper direction and of sufficient strength to cause an impact with the tube support whereby mechanical disturbances are set up between the electrodes of the tube, means for translating the mechanical disturbances into electrical impulses and means for measuring the integrated effect of the electrical impulses, said means comprising a double wave rectifier and a ballistic galvanometer.

7. In apparatus for testing a radio tube for microphonics, a resilient support, a tube mounted on the support, means for energizing the tube, means for causing an impact with the support by a force of accurate reproducibility whereby electrical disturbances are initiated in the tube, means for amplifying and measuring the disturbances, and means for adjusting the amplifier to a constant gain whereby uniformity of test conditions is maintained.

8. In apparatus for testing a radio tube for microphonics, means for energizing the tube, a resilient support for the tube, a weight normally held at a fixed distance from said support, means for releasing the weight to produce an impact with the support whereby electrical disturbances are set up within the tube and whereby the weight tends to rebound and impact with the support a number of times, means for catching and retaining the weight after the first rebound to prevent successive impacts, and means for indicating the integrated amount of said disturbances.

9. In apparatus for testing a radio tube for microphonics, means for energizing the tube, a resilient support for the tube, a weight of magnetic material normally held at a fixed distance from said support, means for releasing the weight to produce an impact with the support whereby electrical disturbances are set up in the tube and whereby the weight tends to rebound and impact with the support a number of times, means for catching and retaining the weight after the first rebound to prevent successive impacts, and means for indicating the integrated amount of said disturbances, said catching and retaining means comprising a permanent magnet.

10. In apparatus for testing the special movement between the electrodes of a radio tube, means for energizing said electrodes, a resilient support for said tube, a weight normally held at a fixed distance from said support by means of a retaining member and having sufficient potential energy to impact with the support when released, means for removing the retaining member out of the path of the weight whereby the weight is released and impacts with said support to cause special movement between said electrodes, and means for measuring the integrated effect of said movement in terms of an electrical current.

11. In apparatus for testing the spacial movement between electrodes of a radio tube, means for energizing said electrodes, a resilient support for said tube, a weight of magnetic material normally held at a fixed distance from said support by means of a retaining member and having sufficient potential energy to impact with the support when released, means for moving the retaining member out of the path of the weight thereby to produce an impact with the tube support whereby mechanical movement is set up between the electrodes and whereby the weight tends to rebound and impact with the support a number of times, magnetic means for catching and retaining the weight after the first rebound to prevent successive impacts, means for translating the movements of the electrodes into electrical impulses and means for measuring the integrated effect of said impulses.

12. The method of testing a tube for microphonics which consists in subjecting the tube to an impact of definite and reproducible intensity, translating the mechanical disturbances within the tube into electrical impulses and measuring the integrated quantity of electricity in each impulse.

13. The method of testing a tube for michophonics which consists in subjecting the tube to an impact of definite and reproducible intensity, translating the mechanical disturbances within the tube into electrical impulses and measuring the amplitude and time duration of each impulse.

In witness whereof, we have hereunto set our hands this 29th day of April, 1929.

ALAN C. ROCKWOOD.
WARREN R. FERRIS.